United States Patent
McKeown

(10) Patent No.: US 10,582,831 B2
(45) Date of Patent: Mar. 10, 2020

(54) DOORMAT WITH CHANGEABLE DISPLAY AND METHOD THEREFOR

(71) Applicant: Darren McKeown, Scottsdale, AZ (US)

(72) Inventor: Darren McKeown, Scottsdale, AZ (US)

( * ) Notice: Subject to any disclaimer, the term of this patent is extended or adjusted under 35 U.S.C. 154(b) by 119 days.

(21) Appl. No.: 15/788,107

(22) Filed: Oct. 19, 2017

(65) Prior Publication Data

US 2019/0117039 A1    Apr. 25, 2019

(51) Int. Cl.
| | | |
|---|---|---|
| A47L 23/26 | (2006.01) | |
| G09F 7/10 | (2006.01) | |
| A46B 5/06 | (2006.01) | |
| H04R 1/02 | (2006.01) | |
| G06F 3/16 | (2006.01) | |
| G09F 23/00 | (2006.01) | |
| G11B 20/10 | (2006.01) | |
| G09F 19/22 | (2006.01) | |

(52) U.S. Cl.
CPC .............. *A47L 23/266* (2013.01); *A46B 5/06* (2013.01); *A47L 23/26* (2013.01); *G06F 3/165* (2013.01); *G09F 7/10* (2013.01); *G09F 19/22* (2013.01); *G09F 19/228* (2013.01); *G09F 23/00* (2013.01); *G09F 23/0066* (2013.01); *G11B 20/10527* (2013.01); *H04R 1/028* (2013.01); *A46B 2200/306* (2013.01); *G11B 2020/10546* (2013.01)

(58) Field of Classification Search
CPC ......... A47L 23/26; A47L 23/266; A46B 5/06; G09F 7/10
See application file for complete search history.

(56) References Cited

U.S. PATENT DOCUMENTS

| | | | | |
|---|---|---|---|---|
| 452,111 | A * | 5/1891 | Reamer .................... | G09F 7/10 40/611.06 |
| 895,320 | A * | 8/1908 | Wilt ......................... | G09F 7/10 40/611.06 |
| 2,995,849 | A * | 8/1961 | Donnellan ................ | G09F 7/10 40/618 |
| 8,859,073 | B1 | 10/2014 | Callas | |

(Continued)

FOREIGN PATENT DOCUMENTS

| | | |
|---|---|---|
| DE | 10084239 | 8/2007 |
| EP | 0 060 148 A1 * | 9/1982 |

(Continued)

OTHER PUBLICATIONS

Everything Doormats Source: https://i.ytimg.com/vi/Jmr-HWAzorM/maxresdefault.jpg http://www.everythingdoormats.com/.

(Continued)

*Primary Examiner* — Randall E Chin
(74) *Attorney, Agent, or Firm* — Weiss & Moy, P.C.; Jeffrey D. Moy

(57) ABSTRACT

A doormat has a base member. A slot is formed in the base member, the slot running along a length and width of the base member. An opening is formed through a top surface of the base member into the slot. An insert is provided. The insert is approximately a size of the base member and configured to be slideable within the slot formed in the base member.

15 Claims, 5 Drawing Sheets

(56) References Cited

U.S. PATENT DOCUMENTS

| | | | |
|---|---|---|---|
| 9,129,513 B1* | 9/2015 | Clarke | G08C 17/02 |
| 2001/0004483 A1 | 6/2001 | Blum et al. | |
| 2003/0091783 A1 | 5/2003 | Calandrino | |
| 2003/0152744 A1 | 8/2003 | Arena | |
| 2004/0119602 A1* | 6/2004 | Blum | A47L 23/22 |
| | | | 340/815.4 |
| 2004/0224130 A1 | 11/2004 | Melucci et al. | |
| 2005/0287330 A1 | 12/2005 | Kessler | |
| 2006/0086026 A1 | 4/2006 | Ho et al. | |
| 2006/0236487 A1* | 10/2006 | Dean | A47L 23/266 |
| | | | 15/215 |
| 2007/0202293 A1* | 8/2007 | Powell | A47L 23/266 |
| | | | 428/67 |
| 2007/0258255 A1 | 11/2007 | Kessler et al. | |
| 2015/0347081 A1* | 12/2015 | Curcio | G08B 3/10 |
| | | | 340/4.4 |

FOREIGN PATENT DOCUMENTS

| | | |
|---|---|---|
| EP | 1 520 507 A2 * | 4/2005 |
| EP | 1372456 | 10/2005 |
| JP | 2003180506 | 7/2003 |

OTHER PUBLICATIONS

Blackhole Cat Litter Mat—Super Size Rectangular 30" X 23"—Blackhole Litter Mat Source: https://www.amazon.com/Moonshuttle-Blackhole-Rectangular-Litter-23-Inch/dp/BOOG67FD6W.
Pyrolysis Model Development for a Multilayer Floor Covering McKinnon, Mark et al. Materials; 2015, 8(9): 6117-6153 DOI: 10.3390/ma8095295.

* cited by examiner

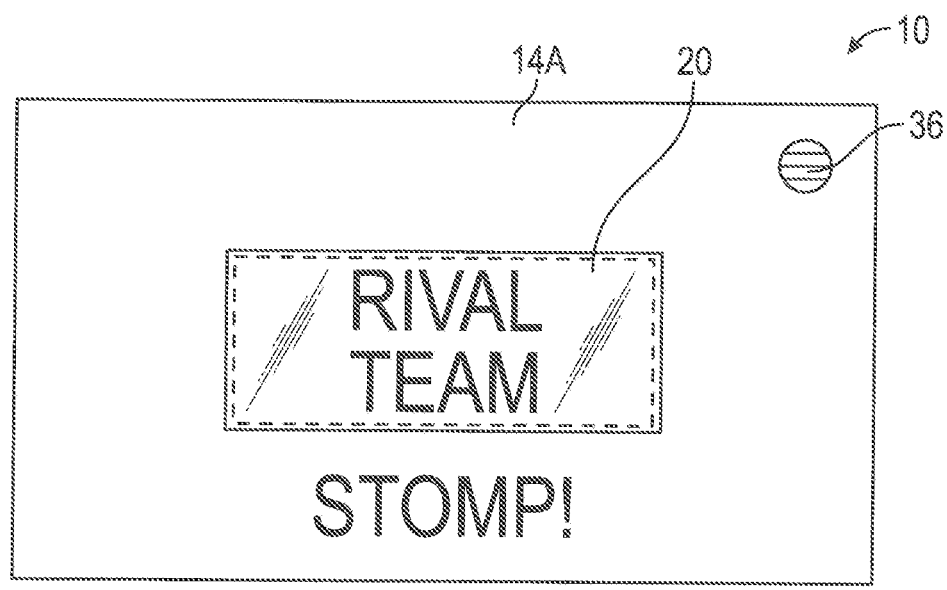
FIG. 3
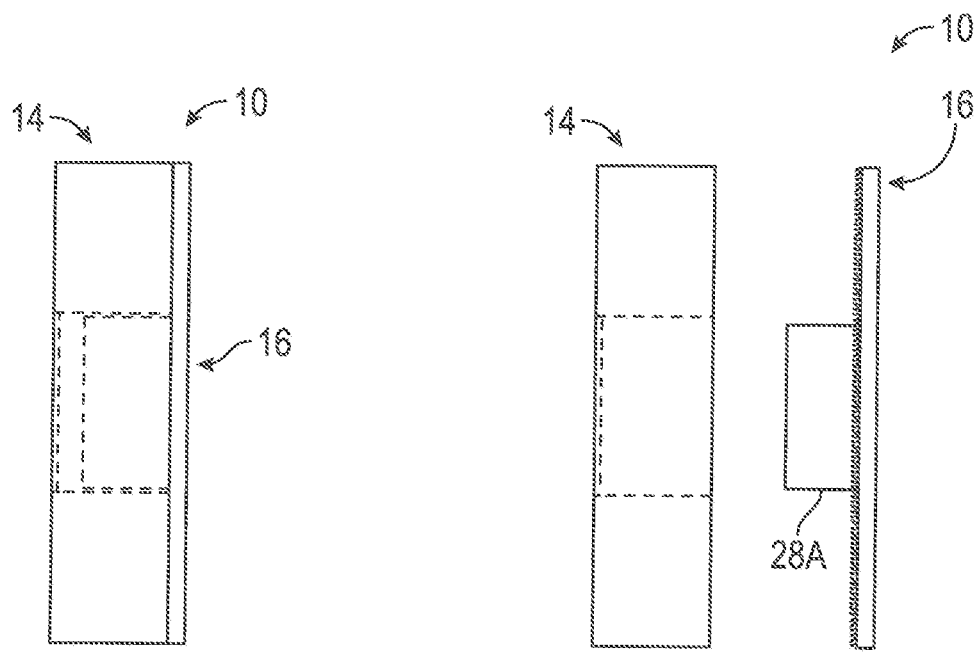
FIG. 4
FIG. 5

DOORMAT WITH CHANGEABLE DISPLAY AND METHOD THEREFOR

TECHNICAL FIELD

The present application generally relates to a floor mat, and core specifically, to a doormat having a display window with a removable backing to alter what is being shown through the display window.

BACKGROUND

Doormats are mats that may be placed in front of a door in a doorway, on which people can wipe their shoes before entering a home and/or building. Doormats may be made from tough, long-lasting material. For example, materials such as coir, palmyra (palm) fibres and stalks, nylon, rubber, cloth, aluminum and other metals may be used to form varies types of doormats. Some doormats may incorporate logos, designs or various indicia on a front surface of the doormat. For example, many doormats may have text such as "WELCOME", the home owner's last name (The Smiths's Home) or the like. The use of logos, designs or various indicia on a front surface of the doormat is generally well known and commonly used in residential as well as commercial doormat applications.

While the idea of having logos, designs or various indicia on a front surface of the doormat may be known, these logos, designs or various indicia are permanent and cannot be changed out. There are some doormats where the logos, designs, text or various indicia may be replaced. However, with these doormats, the user is limited to the choices the user may select. In general, the user may only change the logos, designs or various indicia to one provided by the manufacturer. This severely limits the user's choices.

Therefore, it would be desirable to provide a system and method that overcomes the above. The system and method would provide a doormat, having a display window with a removable backing to allow a user to select what is being shown through the display window.

SUMMARY

In accordance with one embodiment, a doormat is disclosed. The doormat has a base member. A slot is formed in the base member. The slot runs along a length and width of the base member. An opening is formed through a top surface of the base member into the slot. An insert is provided. The insert is approximately a size of the base member and configured to be slideable within the slot formed in the base member.

In accordance with one embodiment, a doormat is disclosed. The doormat has a base member. Indicia are formed of the top surface of the base member. A slot is formed in the base member, the slot running along a length and width of the base member. An opening is formed through a top surface of the base member into the slot. An insert is provided and is approximately a size of the base member and configured to be slideable within the slot formed in the base member. A message circuit is coupled to the base member.

In accordance with one embodiment, a doormat is disclosed. The doormat has a base member. An opening formed through the base member. A rear cover is removably attached to the base member. A raised member is formed on the rear cover. The raised member is sized to fit within the opening and flush with a top surface of the base member. Indicia are formed of the top surface of the base member. A message circuit is coupled to the base member. An article may be positioned on a top surface of the raised member. The article is displayed through the opening when the rear cover is attached to the base member and the raised member is inserted through the opening.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

FIG. 3 is a elevated top view of the doormat of FIG. 1, made in accordance with embodiment of the present invention;

FIG. 4 is a side view of the doormat of FIG. 1, made in accordance with an embodiment of the present invention;

FIG. 5 is an exploded side view of the doormat of FIG. 1, made in accordance with an embodiment of the present invention;

DESCRIPTION OF THE APPLICATION

Figure 1:
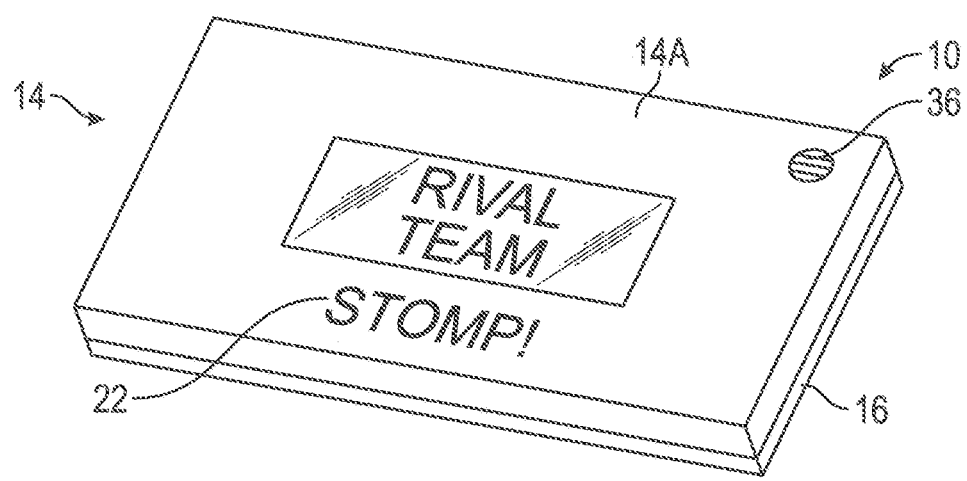
FIG. 1 is a prospective view of a doormat in accordance with an embodiment of the present invention.
Figure 2:
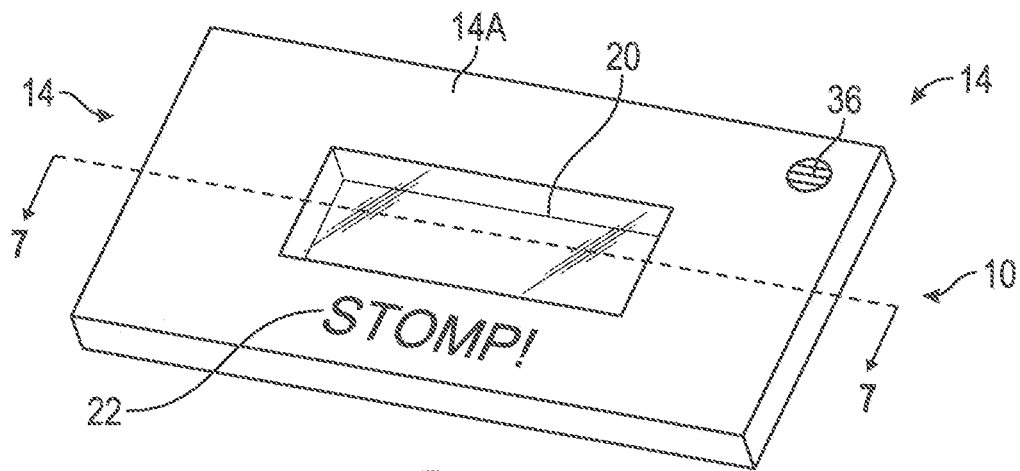
FIG. 2 is an exploded view of the doormat of FIG. 1, made in accordance with an embodiment of the present invention.
Figure 6:
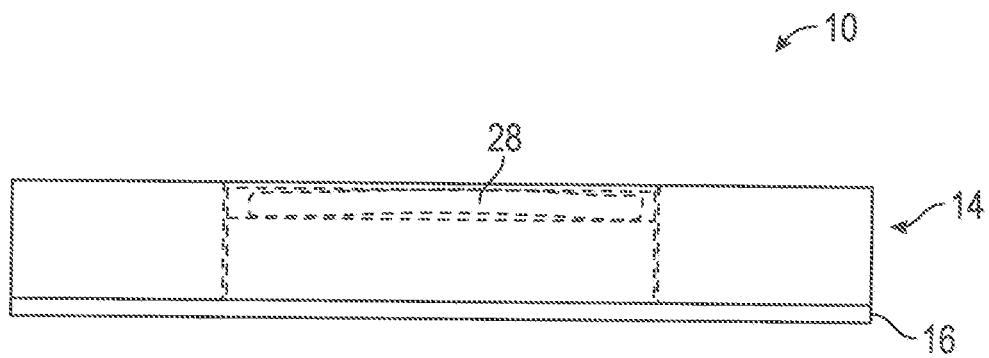
FIG. 6 is a front side view of the doormat of FIG. 1, made in accordance with an embodiment of the present invention.
Figure 7:
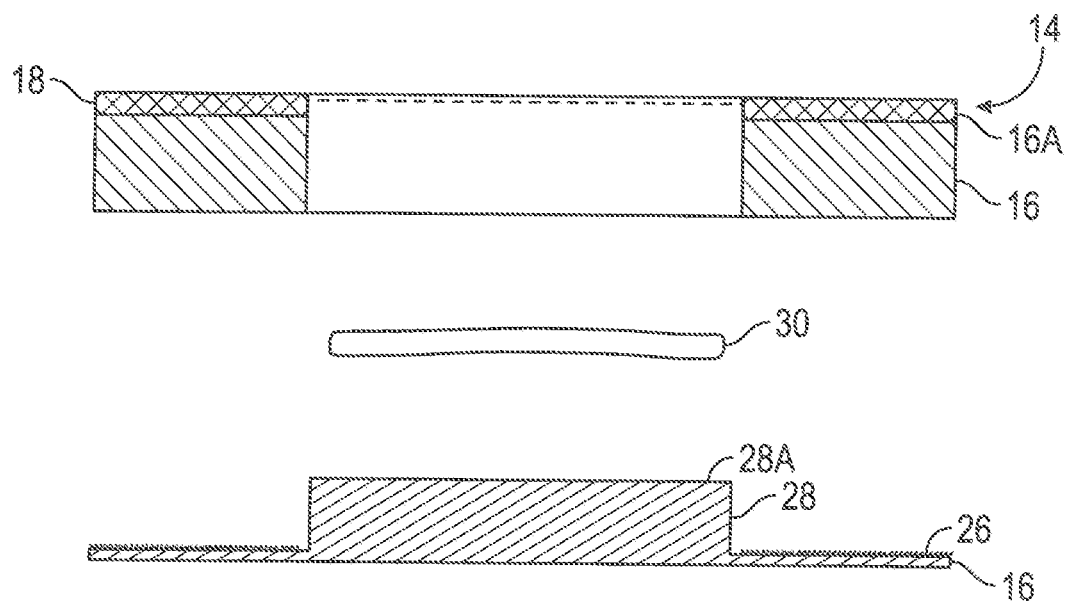
FIG. 7 is an exploded cross-sectional front view of the doormat of FIG. 1, made in accordance with an embodiment of the present invention.

The description set forth below in connection with the appended drawings, is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the exemplary system and method disclose a door neat having a display window. The doormat has a removable backing to allow a user to place a user selected item to be shown through the display window. The item to be displayed through the display window may be hanged at any time by the user and to any user selected logo, design, indicia or the like that may be positioned within the display window.

Referring to the FIGS. 1-7, a doormat 10 may be seen. While the below discussion may be focused on a doormat 10, the doormat 10 may take on other forms such as a floor covering, a rug a carpet, a floor mat or similar articles. The above are given as examples and should not be seen in a limiting manner. The doormat 10 may have a base member 14. The base member 14 may take on different geometric shapes. In the embodiment shown an the the base member 14 may be rectangular in shape. However, this is shown as an example and should not be seen in a limiting manner.

The base member 14 may be formed of different materials. The base member 14 may be made out of coir, palmyra (palm) fibres and stalks, nylon, rubber, cloth, aluminum or other metals. In accordance with one embodiment, the base member 14 may be formed of a cushion 16 such as Ethylene-Vinyl Acetate (EVA) foam, Polyurethane (PU), rubberized foam or similar material. A cover 18 may be formed over a top surface 16A of the cushion material 16. The cover 18 array be more of a rough abrasive surface or upward facing bristles that may allow one to brush/scrape the bottom of a use's shoe. The cover 18 may be formed out of nylon, plastic, polyester, coir, palmyra (palm) fibres and stalks, or similar material.

An opening 20 may be formed through a front surface 14A of the base member 14. In accordance with one embodiment, the opening 20 maybe formed through a central area of the front surface 14A of the base member 14. The opening 20 may be formed completely through the base member 14.

On a front surface 14A of the base member 14, text 22 or other indicia (hereinafter text 22) may be found thereon. In accordance with one embodiment, the text 22 may be formed on the cover 18. However, this is just one embodiment, and the text 22 may be formed on other elements of the base member 14.

The text 22 may be any verbiage. In accordance with one embodiment, the text 22 may be a word such as "STOMP". In accordance with one embodiment, the text 22 may be a phrase wherein a word is missing, the missing word belonging where the opening 20 may be located. For example, the phrase "WIPE _____ OFF THE MAT" may be formed on the front surface of the base member 14. The above are given as examples and should not be seen in a limiting manner. Other text 22 may be used without departing from the spirit of the present invention.

The doormat 10 may have a rear cover 24. The rear cover 24 may be placed on a rear surface 14B of the base member 14. The rear cover 24 may be approximately the same size and shape of the base member 14. The rear cover 24 may be formed of different materials. In accordance with one embodiment, the rear cover 24 may be formed out of a rubber or rubberized material.

The rear cover 24 may be removably coupled to the base member 14. In accordance with one embodiment, connectors 26 may be applied to the rear cover 24. The connectors 26 may be used to removably secure the rear cover 24 to the base member 14. The connectors 26 may be snaps, adhesive or similar articles. In accordance with one embodiment, the connectors 26 may be a hook and/or loop material.

A raised member 28 may be formed on a front surface 24A of the rear cover 24. The raised member 28 may be formed out of the same material as the rear cover 24. The raised member 28 may be of the same dimension and size as the opening 20. Thus, when the rear cover 24 is removably coupled to the base member 14, the raised member 28 may extend up through the opening 20 to be approximately level with the front surface 14A of the base member 14.

A user may place different articles 30 which the user wishes to be displayed on a top surface 28A of the raised member 28. When the rear cover 24 is removably coupled to the base member 14, the article 30 placed on the raised member 28 may extend up through the opening 20 to be approximately level with the front surface 14A of the base member 14. The article 30 may be a t-shirt, bandanna, or other article. The above is given as examples and should not be seen in a limiting manner.

The article 30 being displayed may be changed at any time based on the user's desire. For example, a sports fan may want to change out the article based on the opponent the user's team is playing. In this example, if the opponent is Team XYZ, the user may place an article 30 with the name, logo or the like of Team XYZ on the raised member 28. When the rear cover 24 is removably coupled to the base member 14, the article 30 with the name, logo or the like of Team XYZ may extend up through the opening 20 to be approximately level with the front surface 14A of the base member 14. Thus, in the embodiment show, the doormat 10 may show, STOMP Team XYZ, if the text 22 is "WIPE _____ OFF THE MAT", then the doormat 10 may show WIPE Team XYZ OFF THE MAT.

The doormat 10 may have a pre-recorded message circuit 32 (hereinafter circuit 32). The circuit may be formed within and/or attached to the base member 14. The circuit 32 may play a pre-recorded message when activated. In accordance with one embodiment, the circuit 32 away play a pre-recorded message when pressure is applied to the doormat 10 such as when someone steps of the doormat 10. The pre-recorded message tray be any type of message. For example, in the above embodiment, the pre-recorded message may be a message saying the user's sport team is number 1, a fight song of the user's sports team, or the like. In accordance with one embodiment, the circuit 32 may allow the user to record his/her own message.

Figure 10:
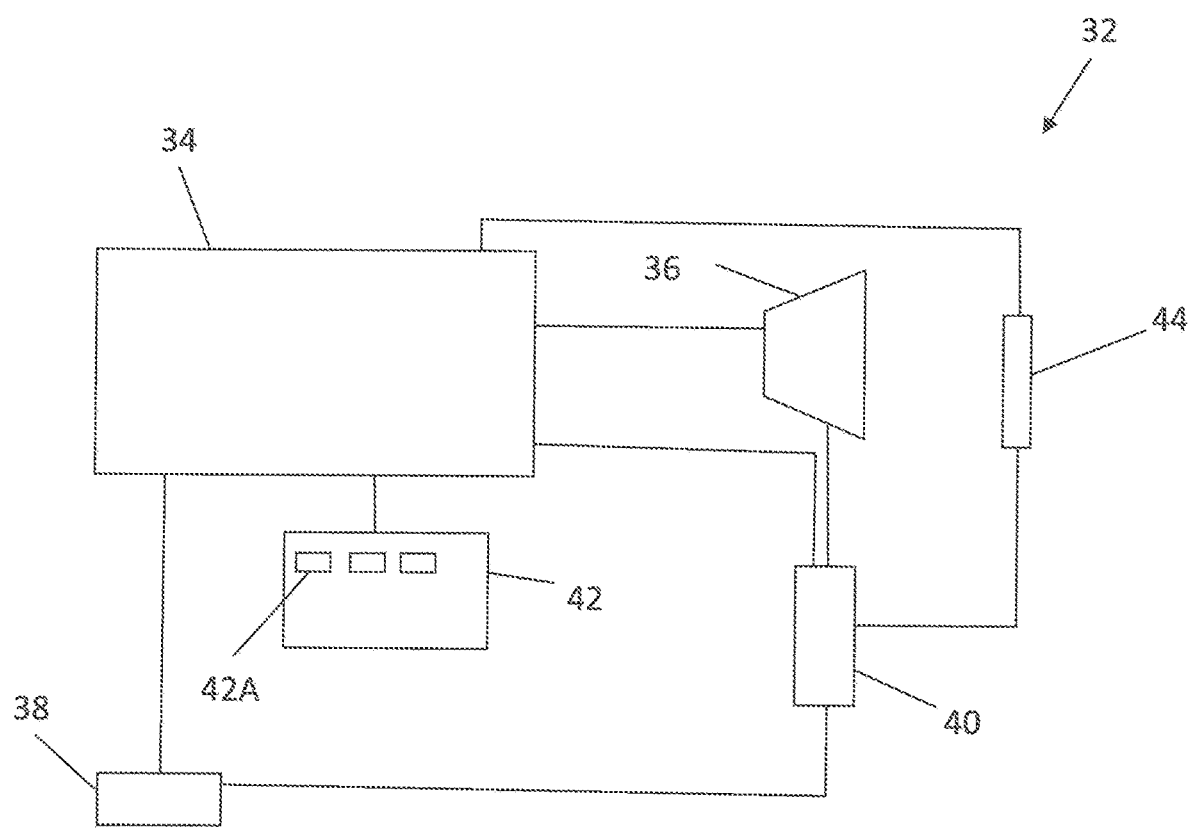
FIG. 10 is a block diagram of a message circuit used in the doormat of FIGS. 1 and 8, made in accordance with an embodiment of the present invention.

Referring to FIG. 10, a block diagram of the circuit 32 may be seen. The circuit 32 may have a processor 34. The processor 34 may be used to store and/or record one or more messages. The processor 34 may be coupled to a speaker 36. The speaker 36 may be used to audibleize the message. A sensor 38 may be coupled to the processor 34. The sensor 38 may be used to signal the processor 34 when to play the message. The sensor 38 may be a pressure sensor, a motion sensor or similar devices. A power supply 40 may be provided. The power supply 40 may be coupled to the processor 34, the speaker 36 and/or the sensor 38. In accordance with one embodiment, the power supply 40 may be a DC power supply such as a battery. In accordance with one embodiment, the power supply 40 may be a DC power supply such as a rechargeable battery.

A control panel 42 may be coupled to the processor 34. The control panel 42 may have Input/Output (I/O) devices 42A. The I/O devices 42A may be used to control operation of the circuit 32. For example, the I/O devices 42A may be used to turn on/off the circuit, select the message to be played, record a new message and the like. The above are given as examples and should not be seen in a limiting manner.

If the circuit 32 is able to record and store new messages, the circuit 32 may have a microphone 44. The microphone 44 may be coupled to the processor 34 and may receive and transform the sound waves for storage within the processor 34.

Figure 8:
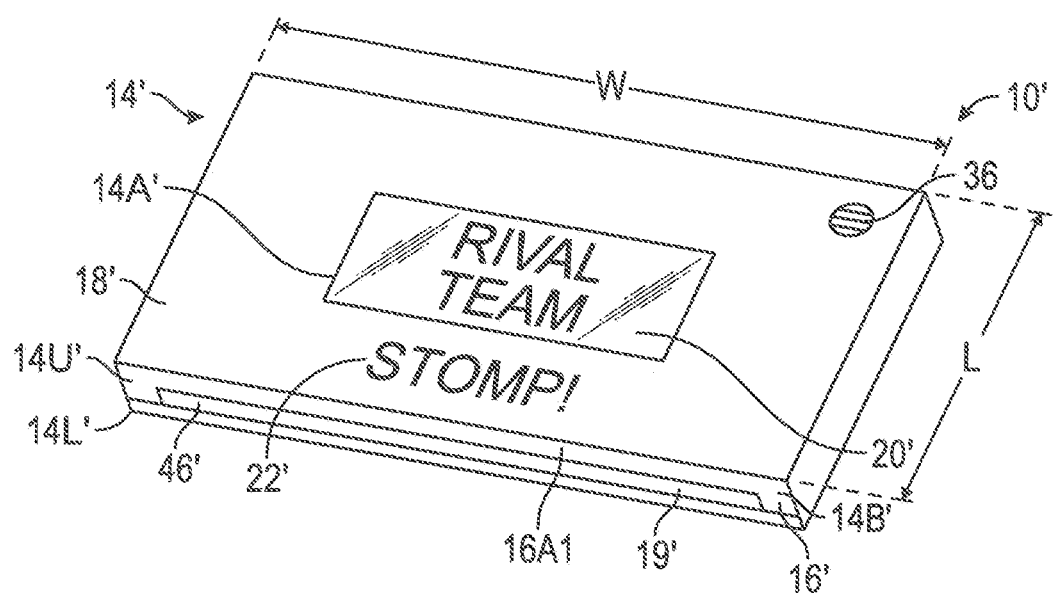
FIG. 8 is a perspective view of another embodiment of a doormat made in accordance with an embodiment of the present invention.
Figure 9:
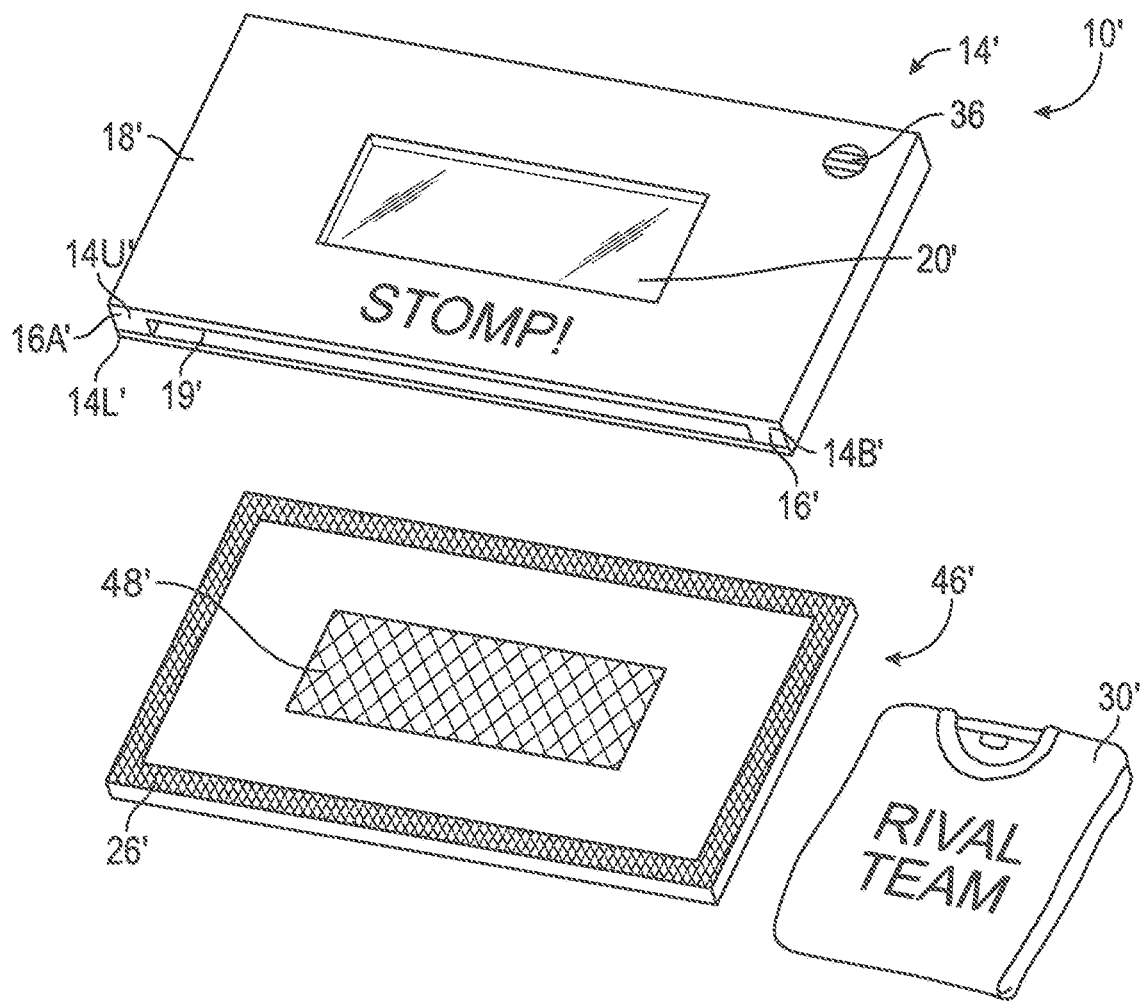
FIG. 9 is an exploded view of the doormat of FIG. 8, made in accordance with an embodiment of the present invention.

Referring to FIGS. 8-9, another embodiment of a doormat 10' may be seen. The doormat 10' may take on other forms such as a floor covering, a rug, a carpet, a floor mat or similar articles. The above are given as examples and should not be seen in a limiting manner. The doormat 10' may have a base member 14'. The base member 14' may take on different geometric shapes. In the embodiment shown in the FIGS.

8-9, the base member 14' may be rectangular in shape. However, this is shown as an example and should not be seen in a limiting manner.

The base member 14' may be formed of different materials. The base member 14' may be made out of coir, palmyra (palm) fibres and stalks, nylon, rubber, cloth, aluminum or other metals. In accordance with one embodiment, the base member 14' may be formed of a cushion material 16' such as Ethylene-Vinyl Acetate (EVA) foam, Polyurethane (PU), rubberized foam or similar material. A cover 18' may be formed over a top surface 16A' of the cushion material 16'. The cover 18' may be more of a rough abrasive surface or upward facing bristles that may allow one to brush/scrape the bottom of a user's shoe. The cover 18' may be formed out of nylon, plastic, polyester, coir, palmyra (palm) fibres and stalks, or similar material.

A slot 19' may be formed in the base member 14'. The slot 19' may be formed within a horizontal surface of the base member 14'. In accordance with one embodiment, the slot 19' may be, formed in a front side surface 14B' of the base member 14'. The slot 19' may run approximately a width W and length L of the base member 14'. The slot 19' does not run completely through the width W and/or length L of the base member 14'.

An opening 20' may be formed through a front surface 14A' of the base member 14'. In accordance with one embodiment, the opening 20' maybe formed through a central area of the front surface 14A' of base member 14'. The opening 20' will be formed through the front surface 14A' to the slot 19'.

In accordance with one embodiment, the base member 14' may be formed of a two piece construction. An upper section 14U' and lower section 14L'. The upper section 14U' may have the slot 19' formed in a bottom area thereof. The slot 19' may be formed within a horizontal surface of the upper section 14U' of the base member 14'. In accordance with one embodiment, the slot 19' may be formed in a front side surface 14B' of the upper section 14U' of the base member 14'. The slot 19' may run approximately a width W and length L of the upper section 14U' of the base member 14'. The slot 19' does not run completely through the width W and/or length L of the upper section 14U' of the base member 14'. The lower section 14L' may be a planer member which may be removably attached to the upper section 14U' thereby forming the base member 14'. The lower section 14L' may be removably attached to the upper section 14U' through the use of hook and loop material, snaps, buttons or other means.

On a front surface 14A' of the base member 14', text 22' or other indicia (hereinafter, text 22') may be formed thereon. In accordance with one embodiment, the text 22' may be formed on the cover 18'. However, this is just one embodiment, and the text 22' may be formed on other elements of the base member 14'.

The text 22' may be any verbiage. In accordance with one embodiment, the text 22' may be a word such as "STOMP". In accordance with one embodiment, the text 22' may be a phrase wherein a word is missing, the missing word belonging where the opening 20' may be located. For example, the phrase "WIPE _____ OFF THE MAT" may be formed on the front surface of the base member 14'. The above are given as examples and should not be seen in a limiting manner. Other text 22' may be used without departing from the spirit of the present invention.

The doormat 10' may have an insert 46'. The insert 46' may be placed in the slot 19' of the base member 14. The insert 46' may be approximately the same size and shape as the slot 19' of the base member 14. The insert 46' may be formed of different materials. In accordance with one embodiment, the insert 46' may be formed out of a rubber or rubberized material. The material used for the insert 46' may be pliable such that the insert 46' may be slightly compressed to slide the insert 46' into the slot 19'. Once placed in the slot 19', the insert 46' may expand to hold the insert 46' within the slot 19'. The insert 46' may expand into the opening 20'.

Connectors 26' may be applied to the front surface 46A' of the insert 46'. The connectors 26' may be used to removably secure the insert 46' within the base member 14'. The connectors 26' may be snaps, adhesive or similar articles. In accordance with one embodiment, the connectors 26' may be a hook and/or loop material.

A raised or rough/textured area 48' may be formed on a front surface 46A' of the insert 46'. The raised or rough/textured area 48' may be of the same dimension and size as the opening 20'. The raised or rough/textured area 48' may extend up through the opening 20' to be approximately level with the front surface 14A' of the base member 14'.

A user may place different articles 30' which the user wishes to be display on the front surface 46A' of the insert 46'. The article 30' may be positioned on the rough/textured area 48'. The rough/textured area 48' may keep the article 30' in place on the rough/textured area 48' when the insert 46' is slid within the slot 19'. The article 30' may be a t-shirt, bandanna, or other article. The above is given as examples and should not be seen in a limiting manner.

The article 30' being displayed may be changed at any time based on the user's desire. For example, a sports fan may want to change out the article based on the opponent the user's team is playing. In this example, if the opponent is Team XYZ, the user may place an article 30' with the name, logo or the like of Team XYZ on the rough/textured area 48'. When the insert 46' is slid within the slot 19', the article 30' with the name, logo or the like of Team XYZ may extend up through the opening 20' to be approximately level with the front surface 14A' of the base member 14'. Thus, in the embodiment show, the doormat 10' may show, STOMP Team XYZ. If the text 22' is "WIPE _____ OFF THE MAT", then the doormat 10' may show WIPE Team XYZ OFF THE MAT.

The doormat 10' may have a pre-recorded message circuit 32 (hereinafter circuit 32). The circuit 32 may be formed within and/or attached to the base member 14'. The circuit 32 may play a pre-recorded message when activated. In accordance with one embodiment, the circuit 32 may play a pre-recorded message when pressure is applied to the doormat 10' such as when someone steps of the doormat 10'. The pre-recorded message may be any type of message. For example, in the above embodiment, the pre-recorded message may be a message saying the user's sport team is number 1, a fight song of the user's, sports team, or the like. In accordance with one embodiment, the circuit 32 may allow the user to record his/her own message. In accordance with one embodiment, the circuit 32 may be that as shown in FIG. 10.

The foregoing description is illustrative of particular embodiments of the application, but is not meant to be a limitation upon the practice thereof. The following claims, including all equivalents thereof, are intended to define the scope of the application.

What is claimed is:

1. A doormat comprising:
   a base member;
   a slot formed in the base member, the slot running along a length and width of the base member;

an opening formed through a top surface of the base member into the slot; and an insert, the insert approximately a size of the slot and configured to be slideable within the slot formed in the base member, wherein the insert is formed of a pliable material that expands once positioned within the slot, a portion of the insert expanding into the opening.

2. The doormat of claim 1, comprising indicia formed of the top surface of the base member.

3. The doormat of claim 1, comprising a message circuit coupled to the base member.

4. The doormat of claim 3, wherein the message circuit comprises:
a processor storing a message;
a speaker coupled to the processor; and
a sensor coupled to the processor signaling the processor to play the recorded message.

5. The doormat of claim 4 comprising a microphone coupled to the processor receiving sound signals for recording a personalized message.

6. The doormat of claim 1, wherein the base member comprises:
a cushion layer; and
a cover layer formed on a top surface of the cushion layer.

7. The doormat of claim 6, wherein the cover layer has a rough abrasive surface.

8. The doormat of claim 1, wherein the base member comprises:
an upper section, the slot formed in a bottom area thereof; and
a lower section removably attached to the upper section.

9. The doormat of claim 1, wherein the insert has one of a raised or a rough area formed on a front surface of the insert.

10. A doormat comprising:
a base member;
indicia formed of the top surface of the base member;
a slot formed in the base member, the slot running along a length and width of the base member;
an opening formed through a top surface of the base member into the slot;
an insert, the insert approximately a size of the slot and configured to be slideable within the slot formed in the base member, wherein the insert is formed of a pliable material that expands once positioned within the slot, a portion of the insert expanding into the opening; and
a message circuit coupled to the base member.

11. The doormat of claim 10, wherein the base member comprises:
a cushion layer; and
a cover layer formed on a top surface of the cushion layer, wherein the cover layer has a rough abrasive surface.

12. The doormat of claim 10, wherein the base member comprises:
an upper section, the slot formed in a bottom area thereof; and
a lower section removably attached to the upper section.

13. The doormat of claim 10, wherein the insert has one of a raised or a rough area formed on a front surface of the insert.

14. The doormat of claim 10, wherein the message circuit comprises:
a processor storing a message;
a speaker coupled to the processor;
a sensor coupled to the processor signaling the processor to play the recorded message; and
a microphone coupled to the processor receiving sound signals for recording a personalized message.

15. A doormat comprising:
a base member;
a slot formed in the base member, the slot running along a length and width of the base member;
an opening formed through a top surface of the base member into the slot; and
an insert, the insert approximately a size of the slot and configured to be slideable within the slot formed in the base member;
wherein the base member comprises:
an upper section, the slot formed in a bottom area thereof; and
a lower section removably attached to the upper section.

* * * * *